US012632798B2

(12) United States Patent
Mehmani et al.

(10) Patent No.: US 12,632,798 B2
(45) Date of Patent: May 19, 2026

(54) SYSTEMS AND METHODS FOR MITIGATING TRAINING DATA BASELINE SHIFTS IN ARTIFICIAL INTELLIGENCE MODELS COMPRISING MOVING CLASSIFICATIONS

(71) Applicant: Capital One Services, LLC, McLean, VA (US)

(72) Inventors: Ayaz Mehmani, McLean, VA (US); Ruoyu Shao, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 550 days.

(21) Appl. No.: 18/359,568

(22) Filed: Jul. 26, 2023

(65) Prior Publication Data

US 2025/0037037 A1    Jan. 30, 2025

(51) Int. Cl.
*G06N 20/20*      (2019.01)

(52) U.S. Cl.
CPC .................................... *G06N 20/20* (2019.01)

(58) Field of Classification Search
CPC ....................................................... G06N 20/20
See application file for complete search history.

(56) References Cited

U.S. PATENT DOCUMENTS

| | | | | |
|---|---|---|---|---|
| 11,556,848 B2 * | 1/2023 | Park | ...................... | G06N 3/0475 |
| 11,575,697 B2 * | 2/2023 | Palani | .................. | G06N 3/0895 |
| 11,900,062 B2 * | 2/2024 | Le | ........................... | G06N 20/20 |
| 11,960,904 B2 * | 4/2024 | Eranpurwala | .......... | G06N 20/10 |
| 12,141,671 B2 * | 11/2024 | Guo | ........................ | G06Q 50/06 |
| 12,298,840 B1 * | 5/2025 | Bhatia | .................. | G06F 11/0751 |
| 12,367,080 B2 * | 7/2025 | Lowe | ................... | G06F 18/254 |
| 2022/0237468 A1 * | 7/2022 | Fang | ................... | H04L 63/1408 |
| 2022/0292239 A1 * | 9/2022 | Kahraman | ............. | G06N 20/00 |
| 2023/0075453 A1 * | 3/2023 | Mitra | .................... | G06F 16/285 |
| 2025/0021866 A1 * | 1/2025 | Doan Huu | ............. | G06N 20/00 |

* cited by examiner

*Primary Examiner* — Viral S Lakhia
(74) *Attorney, Agent, or Firm* — Foley & Lardner LLP

(57) ABSTRACT

The system generates multiple classes of training data depending on their baseline shift. The system then trains a model or ensemble of models leveraging the entire dataset without the need for training them separately. A set of uniform input feature are generated for a user based on profile of the data (e.g., based on a user's auto loan terms and/or credit history). The system then engineers additional characteristic features based on the time criteria (e.g., based on a time period overlap with the time period of the classes and what class the profile data originated from). The system uses this time criteria (e.g., whether profile data originated from a given class and the amount of overlap of the data with a class) to determine how the feature input is processed through the models.

20 Claims, 5 Drawing Sheets

400

Receive a request for a time-series prediction based on a time series profile   402

Determine an initiation class for the time series profile   404

Determine a first class overlap for the time series profile   406

Determine a processing characteristic for the time series profile   408

Process the time series profile through one or more models   410

Receive an output from the one or more models   412

Generate a time-series prediction based on the output   414

Month on Book

<u>400</u>

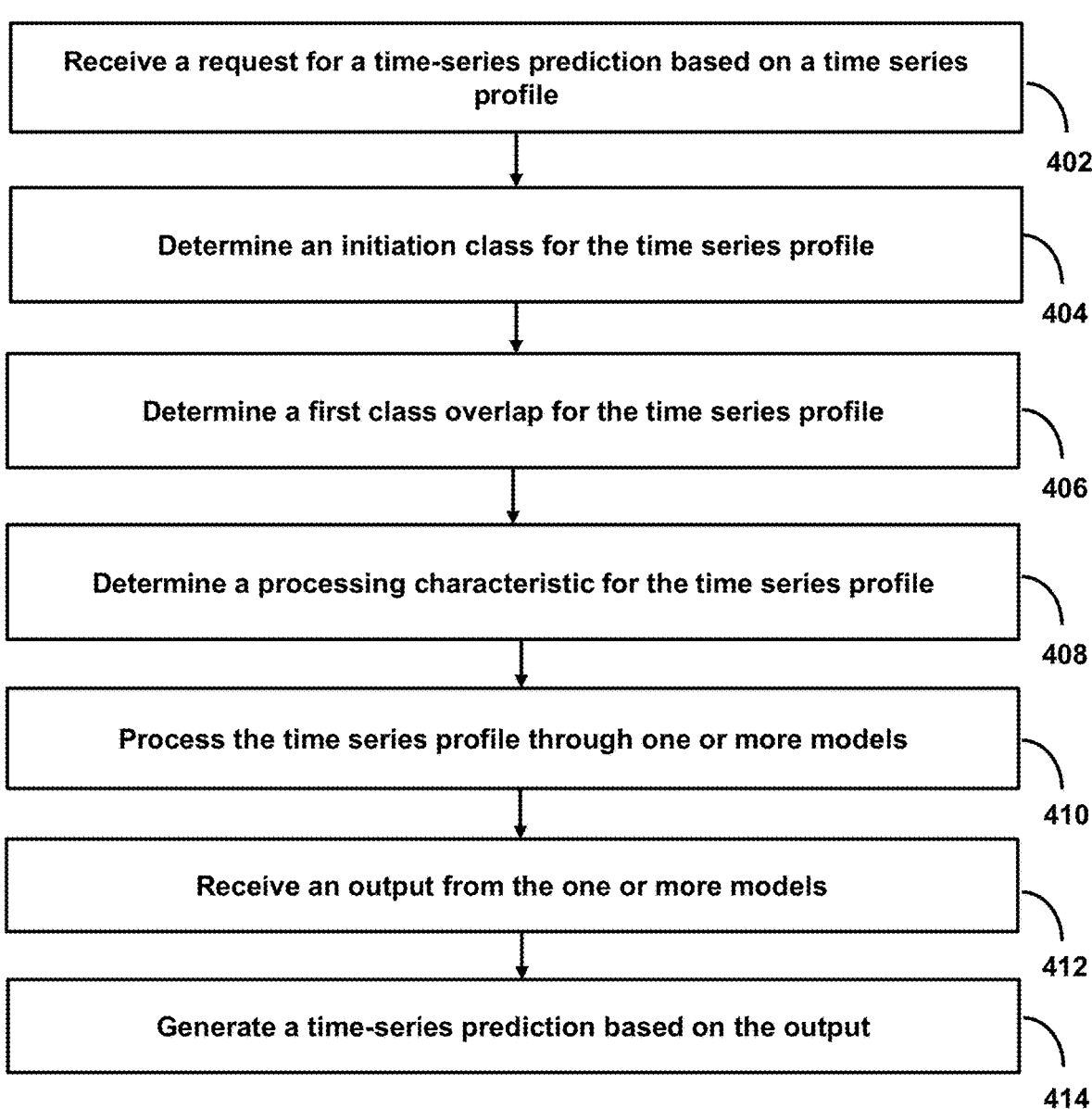

Receive a request for a time-series prediction based on a time series profile

402

Determine an initiation class for the time series profile

404

Determine a first class overlap for the time series profile

406

Determine a processing characteristic for the time series profile

408

Process the time series profile through one or more models

410

Receive an output from the one or more models

412

Generate a time-series prediction based on the output

SYSTEMS AND METHODS FOR MITIGATING TRAINING DATA BASELINE SHIFTS IN ARTIFICIAL INTELLIGENCE MODELS COMPRISING MOVING CLASSIFICATIONS

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time-consuming. Additionally, data that is obtained may need to be categorized and labeled accurately, which can be difficult, time-consuming, and a manual task.

These problems are even further exacerbated in instances where training data may exhibit baseline shifts. For example, a baseline shift may comprise a repositioning of a dominant-baseline for one time period relative to another. In such instances, training data for one period may not translate to accurate and/or precise predictions in another time period. This is particularly true when analyzing time series data as the time series data introduces yet another relationship that must be monitored and accounted for when looking for correlations in models. These technical problems may present an inherent problem with attempting to use an artificial intelligence-based solution in generating time series predictions based on time series data that may span one or more baseline shifts.

SUMMARY

Methods and systems are described herein for novel uses and/or improvements to artificial intelligence applications. As one example, methods and systems are described herein for training data baseline shifts in artificial intelligence models comprising moving classifications.

For example, time series analysis models (e.g., network utilization, auto loan survival, cyber incident reporting, credit default rates, and/or other models that rely on time series data) are moving classification problems (models continually being trained and/or updated as new data is generated) that determine the likelihood of an event (e.g., network use, a loan pay-off, a cyber attack, a credit default, etc.) based on current state conditions. Given that these models are trained on historic data over long periods of time, these models are relatively accurate for general, long-term trends. These models are less accurate, and may miss completely, short outlier events (e.g., a surge in defaults during a pandemic). Even more problematic is these models are susceptible to a lengthy training lag upon the occurrence of a baseline shift in the training data (e.g., a baseline shift in state conditions during and after a pandemic).

One solution to account for outliers is to determine expiration dates for training data. However, such an approach risks eliminating valuable data that helps to indicate long-term trends. Another approach is to tag data that appears as outlier data; however, this approach risks introducing systematic bias into the modeling process as it devalues data that may be covariant with a baseline shift.

In contrast, the system generates two classes of training data based on a known baseline shift. The system can then either train multiple models in sequence or leverage the entire dataset to train a single model in one step. A uniform feature input is then generated for a user based on profile data (e.g., based on a user's auto loan terms and/or credit history). The system then determines a processing characteristic based on time criteria (e.g., based on a time period overlap with the time period of the two classes and what class the profile data originated from). The system uses this time criteria (e.g., whether profile data originated from a given class and the amount of overlap of the data with a class) to parse out model signals from anomalous time periods. By doing so, the system accounts for the baseline shift through a method that does not eliminate valuable data (thus preserving long-term trend accuracy) as well as eliminates systematic bias against outliers that may be covariant with a baseline shift. Accordingly, a prediction based on the output of this model has higher accuracy and precision.

In some aspects, systems and methods for mitigating training data baseline shifts in artificial intelligence models comprise moving classifications. For example, the system may receive a first request for a first time series prediction based on a first time series profile, wherein the first time series profile comprises time series profile data during a first time period, wherein the first time period begins at a first time point. The system may determine a first initiation class for the first time series profile based on whether the first time point occurred during a first training period or a second training period, wherein the first training period corresponds to a first training data baseline, and wherein the second training period corresponds to a second training data baseline. The system may determine a first class overlap for the first time series profile based on a first length of time that the first time period overlaps with the first training period. The system may determine a processing characteristic based on a class timeline based on the first initiation class and any class overlap. The system may process the uniform feature input and the processing characteristic through one or more models, wherein the one or more models comprise of model or models are trained on training data for the first training period and the second training period. The system may receive a first aggregated output from the one or more models. The system may generate for display, at a user interface, first time series prediction based on the first aggregated output. The proposed method can therefore ingest streaming data without the need for model restructuring or changing preprocessing steps.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 shows a flowchart of the steps involved in mitigating training data baseline shifts in artificial intelligence models comprising moving classifications, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
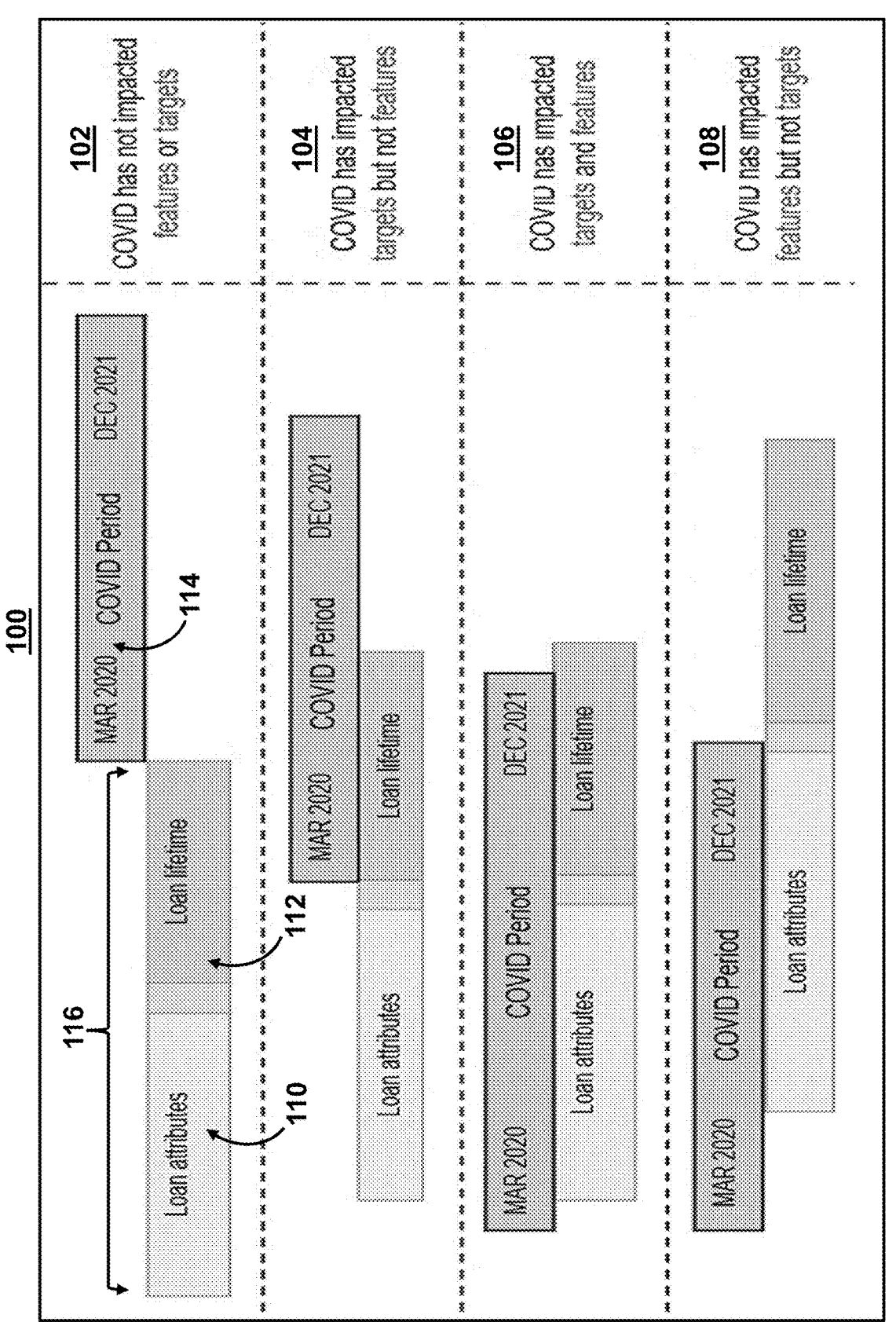
FIG. 1 shows an illustrative diagram for mitigating training data baseline shifts, in accordance with one or more embodiments.

FIG. 1 shows an illustrative diagram for mitigating training data baseline shifts, in accordance with one or more embodiments. As described herein, the systems and methods may relate to mitigating training data baseline shifts in artificial intelligence models comprising moving classifications. For example, time series analysis models (e.g., network utilization, auto loan survival, cyber incident reporting, credit default rates, and/or other models that rely on time series data) are moving classification problems (models continually being trained and/or updated as new data is generated) that determine the likelihood of an event (e.g., network use, a loan pay-off, a cyber attack, a credit default, etc.) based on current state conditions.

FIG. 1 shows an embodiment related to predictions for auto loan survival. For example, diagram 100 shows four different scenarios (e.g., scenario 102, scenario 104, scenario 106, and scenario 108). In FIG. 1, the system generates multiple classes of training data (e.g., class 110 and class 112) based on a known baseline shift (e.g., shift 114). For example, class 110 corresponds to an initiation class for time series profile 116. In the present embodiment, class 110 corresponds to loan attributes for an auto loan that are determined upon the initiation of the loan. In contrast, class 112 corresponds to a lifetime of a loan. For example, loan credit risk models are moving classification problems in that their feature and target space are directly dependent on the timeline of the loan as shown in FIG. 1. Rare economic shocks create significant drifts in targets related to consumer behaviors (such as charge-off, early-pay-off) resulting in high errors in model predictions. Such shocks furthermore contaminate inherent relationship changes between loan features and its performance that are unfamiliar to the machine learning pipeline.

FIG. 1 also shows shift 114, which in FIG. 1 corresponds to the COVID pandemic. For example, the system may use two indicators that inform the model on whether a loan was issued during COVID (horizontal COVID indicator) and/or whether a statement date coincides within the COVID period (vertical COVID indicator). By doing so, the system avoids additional preprocessing overheads of alternative approaches, such as leveraging macroeconomic variables, and does not require excessively refactoring a production pipeline.

The system then trains a model independently of the classes. A feature input is then generated for a user based on profile data (e.g., based on a user's auto loan terms and/or credit history). The system then determines a processing characteristic based on time criteria (e.g., based on a time period overlap with the time period of the two classes and what class the loan was initiated in). The system uses this time criteria (e.g., whether a loan was initiated during a given class and the amount of overlap of the loan with a class) to determine how the feature input is processed through the two models. By doing so, the system accounts for the baseline shift (e.g., a baseline shift due to changing market conditions) through a method that does not eliminate valuable data (thus preserving long-term trend accuracy) as well as eliminates systematic bias against outliers that may be covariant with a baseline shift. Accordingly, a prediction based on the output of the two models has higher accuracy and precision.

Scenario 102 shows an example where shift 114 does not overlap with time series profile 116. In such an example, the system may determine that there is no class overlap for time series profile 116. Additionally, the system may determine that an initiation class for time series profile 116 does not correspond to any class (e.g., neither class 110 nor class 112). Scenario 104 shows an example where shift 114 overlaps with class 112 of time series profile 116. In such an example, the system may determine that there is a class overlap for time series profile 116 with class 112. Additionally, the system may determine that an initiation class for time series profile 116 corresponds to class 112. Scenario 106 shows an example where shift 114 overlaps with class 110 and class 112 of time series profile 116. In such an example, the system may determine that there is a class overlap for time series profile 116 with class 110 and class 112. Additionally, the system may determine that an initiation class for time series profile 116 corresponds to class 110. Finally, scenario 108 shows an example where shift 114 overlap with class 110 of time series profile 116, but not class 112. In such an example, the system may determine that there is a class overlap for time series profile 116 with only class 110.

Figure 2A:
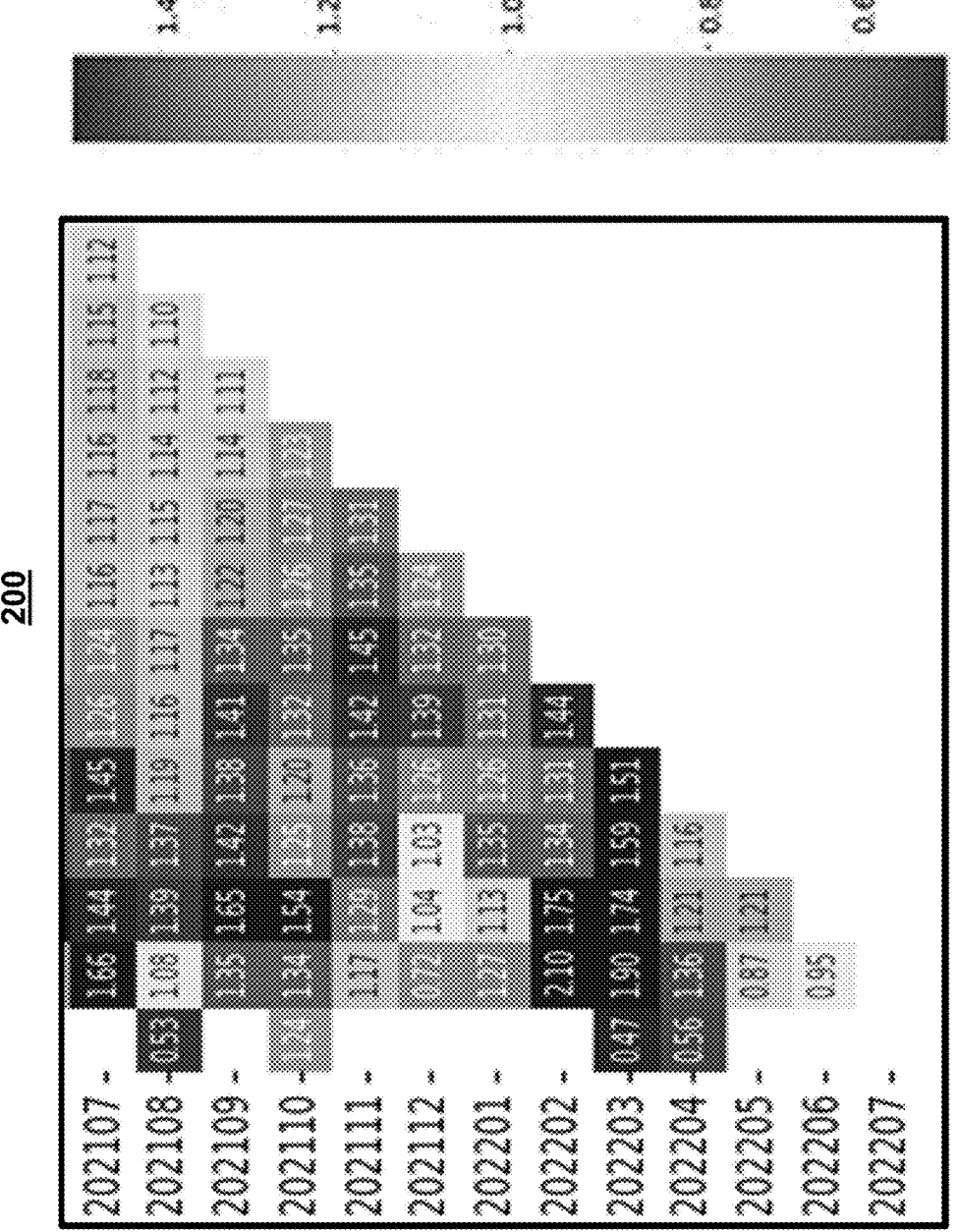
FIG. 2A shows an illustrative diagram for results of a classification model without mitigating training data baseline shifts, in accordance with one or more embodiments.

FIG. 2A shows an illustrative diagram for results of a classification model without mitigating training data baseline shifts, in accordance with one or more embodiments. For example, FIG. 2A shows diagram 200. Diagram 200 gives an example of subprime loans in which the aggregate deviation of actual to prediction ratio is 0.187. Thus, diagram 200 represents a classification model without mitigating training data baseline shifts.

Figure 2B:
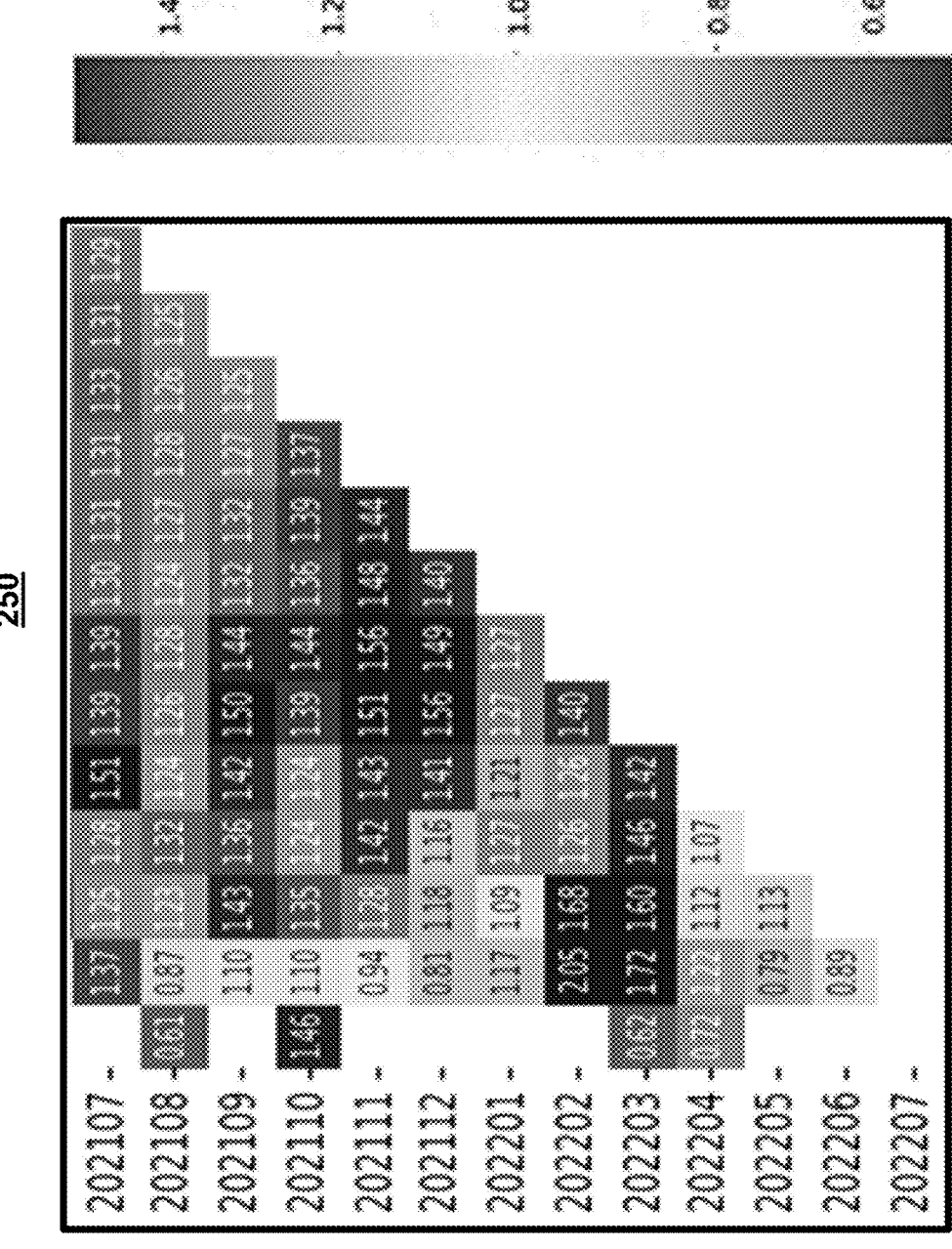
FIG. 2B shows an illustrative diagram for results of a classification model that mitigates training data baseline shifts, in accordance with one or more embodiments.

In contrast, FIG. 2B shows an illustrative diagram for results of a classification model that mitigates training data baseline shifts, in accordance with one or more embodiments. For example, FIG. 2B shows diagram 250. Diagram 250 gives an example of subprime loans in which the aggregate deviation for actual to prediction ratio is 0.100. Thus, diagram 250 represents a classification model that mitigates training data baseline shifts. For example, diagram 250 shows marked improvement in model performance for loans both during and outside the COVID period.

In some embodiments, the system may generate for display, at a user interface, a first time series prediction based on a first aggregated output based on mitigating training data baseline shifts in artificial intelligence models. As referred to herein, a "user interface" may comprise a human-computer interaction and communication in a device, and may include display screens, keyboards, a mouse, and the appearance of a desktop. For example, a user interface may comprise a way a user interacts with an application or a website.

As referred to herein, "content" should be understood to mean an electronically consumable user asset, such as Internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

The system may monitor content generated by the user to generate profile data. As referred to herein, "a profile" and/or "profile data" may comprise data actively and/or passively collected about a user, device, and/or network. For example, the profile data may comprise content generated by a user and a user characteristic for the user. A profile may be content consumed and/or created by a user.

Profile data may also include a data characteristic. As referred to herein, "a data characteristic" may include about a user, device, network, and/or other information in a directory of stored user settings, preferences, and information for the user. For example, a profile may have the settings for the user's installed programs and operating system. In some embodiments, the profile may be a visual display of personal data associated with a specific user, or a customized desktop environment. In some embodiments, the profile may be a digital representation of a person's identity. The data in the user profile may be generated based on the system actively or passively monitoring. In some embodiments, the profile may comprise data related to network utilization, auto loan survival, cyber incident reporting, credit default rates, and/or other models that rely on time series data.

As described herein, "time series data" may include a sequence of data points that occur in successive order over some period of time. In some embodiments, time series data may be contrasted with cross-sectional data, which captures a point-in-time. A time series can be taken on any variable that changes over time. The system may use a time series to track the variable over time. This can be tracked over the short term, such as the repayment rate of a loan on the hour over the course of a business day, or the long term, such as every month over the course of five years. The system may generate a time series analysis. For example, a time series analysis may be useful to see how a loan, security, or economic variable changes over time. It can also be used to examine how the changes associated with the chosen data point compare to shifts in other variables over the same time period.

The time series analysis may determine various trends, such as a secular trend, which describe the movement along the term; a seasonal variation, which represents seasonal changes; cyclical fluctuations, which correspond to periodical but not seasonal variations; and irregular variations, which are other nonrandom sources of variations of series. The system may maintain correlations for this data during modeling. In particular, the system may maintain correlations through non-normalization, as normalizing data inherently changes the underlying data which may render correlations, if any, undetectable and/or lead to the detection of false positive correlations. For example, modeling techniques (and the predictions generated by them), such as rarefying (e.g., resampling as if each sample has the same total counts), total sum scaling (e.g., dividing counts by the sequencing depth), and others, and the performance of some strongly parametric approaches, depends heavily on the normalization choices.

As referred to herein, "a data stream" may refer to data that is received from a data source that is indexed or archived by time. This may include streaming data (e.g., as found in streaming media files) or may refer to data that is received from one or more sources over time (e.g., either continuously or in a sporadic nature). A data stream segment may refer to a state or instance of the data stream. For example, a state or instance may refer to a current set of data corresponding to a given time increment or index value. For example, the system may receive time series data as a data stream. A given increment (or instance) of the time series data may correspond to a data stream segment.

As referred to herein, a "modeling error" or simply an "error" may correspond to an error in the performance of the model. For example, an error in a model may comprise an inaccurate or imprecise output or prediction for the model. This inaccuracy or imprecision may manifest as a false positive or a lack of detection of a certain event. These errors may occur in models corresponding to a particular sub-segment that result in inaccuracies for predictions and/or output based on the sub-segment, and/or the errors may occur in models corresponding to an aggregation of multiple sub-segments that result in inaccuracies for predictions and/or outputs based on errors received in one or more of predictions of the plurality of sub-segments and/or an interpretation of the predictions of the plurality of sub-segments.

Figure 3:
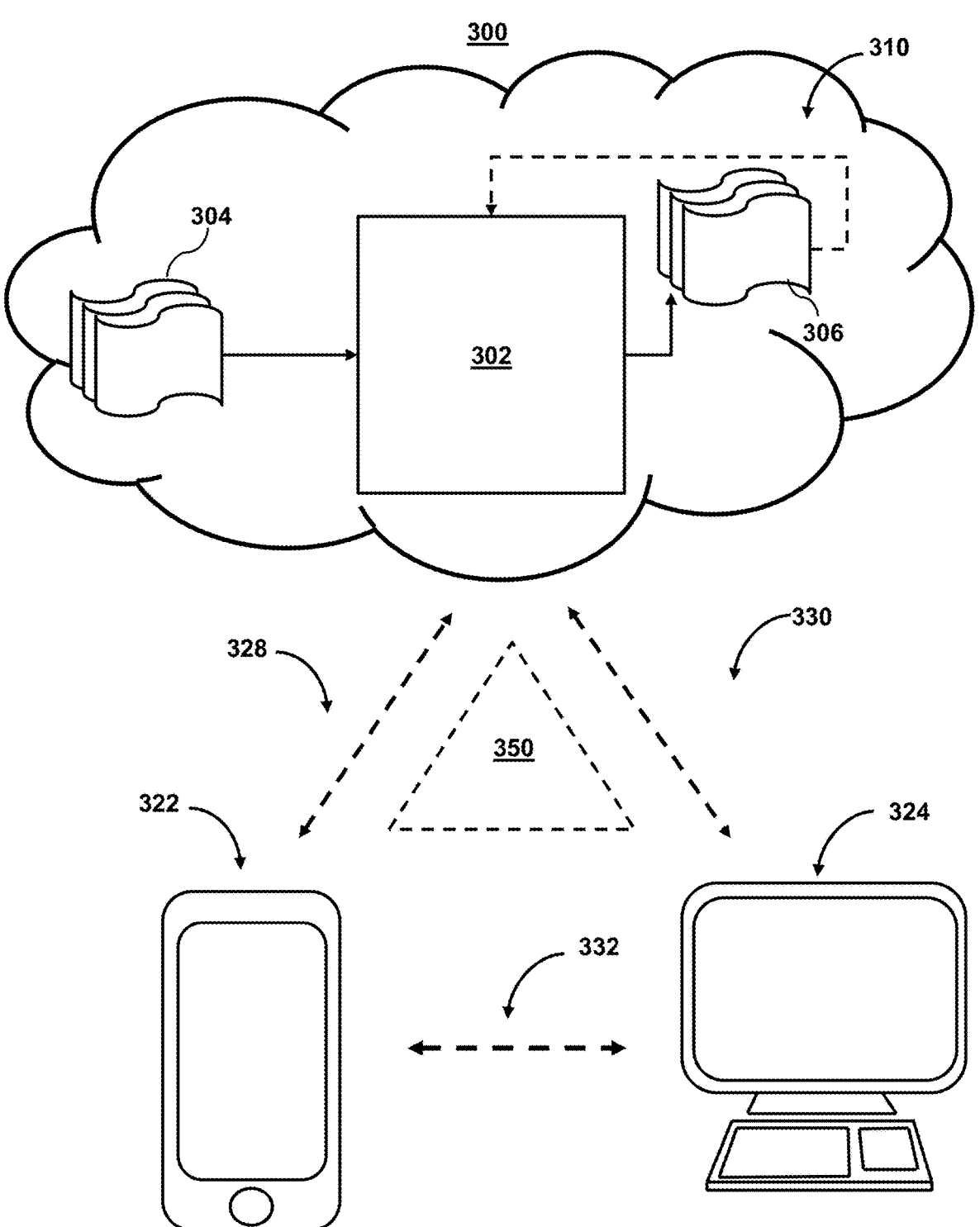
FIG. 3 shows illustrative components for a system used to mitigate training data baseline shifts in artificial intelligence models, in accordance with one or more embodiments.

FIG. 3 shows illustrative components for a system used to mitigate training data baseline shifts in artificial intelligence models, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device, such as a computer screen, and/or a dedicated input device, such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred to collectively herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., network utilization rates, auto loan survival rates, cyber incident rates, credit default rates, and/or other time series predictions).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., network utilization rates, auto loan survival rates, cyber incident rates, credit default rates, and/or other time series predictions).

In some embodiments, the model (e.g., model 302) may automatically perform actions based on outputs 306. In some embodiments, the model (e.g., model 302) may not perform any actions. The output of the model (e.g., model 302) may be used to generate network utilization rates, auto loan survival rates, cyber incident rates, credit default rates, and/or other time series predictions.

System 300 also includes API layer 350. API layer 350 may allow the system to generate summaries across different devices. In some embodiments, API layer 350 may be implemented on mobile device 322 or user terminal 324. Alternatively, or additionally, API layer 350 may reside on one or more of cloud components 310. API layer 350 (which may be a REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources, such as Service Repository and Developer Portal, but with low governance, standardization, and separation of concerns. Alternatively, system 300 may be fully based on API layer 350, such that separation of concerns between layers, such as API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols, such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDoS protection, and API layer 350 may use RESTful APIs as standard for external integration.

FIG. 4 shows a flowchart of the steps involved in mitigating training data baseline shifts in artificial intelligence models comprising moving classifications, in accordance with one or more embodiments. In some embodiments, the system may relate to predictions related to auto loan survival. For example, the system may generate two classes of training data based on a known baseline shift (e.g., a worldwide pandemic). The system then trains a set of models simultaneously or in sequence with both classes. A feature input is then generated for a user based on profile data (e.g., based on a user's auto loan terms and/or credit history). The system then determines a processing characteristic based on time criteria (e.g., based on a time period overlap with the time period of the two classes and what class the loan was initiated in). The system uses this time criteria (e.g., whether a loan was initiated during a given class and the amount of overlap of the loan with a class) to determine how the feature input is processed through the two models. By doing so, the system accounts for the baseline shift (e.g., a baseline shift due to changing market conditions) through a method that does not eliminate valuable data (thus preserving long-term trend accuracy) as well as eliminates systematic bias against outliers that may be covariant with a baseline shift. Accordingly, a prediction based on the output of the two models has higher accuracy and precision.

At step 402, process 400 (e.g., using one or more components described above) receives a request for a time series prediction based on a time series profile. For example, the system may receive a first request for a first time series prediction based on a first time series profile, wherein the first time series profile comprises time series profile data during a first time period, wherein the first time period begins at a first time point. For example, the system may receive a request to generate a prediction, such as the likelihood that an auto loan may be charged off.

In some embodiments, the system may receive a user input indicating a baseline shift. Alternatively, or additionally, the system may automatically determine a baseline shift. For example, a baseline shift may comprise a repositioning of a dominant-baseline for one time period relative to another. In some embodiments, the system may determine a baseline shift using one or more models and/or algorithms. For example, the system may use Bayesian multivariate linear regression, which is a Bayesian approach to multivariate linear regression (e.g., a linear regression where the predicted outcome is a vector of correlated random variables rather than a single scalar random variable). The system may then determine whether a predicted variable is outside a given range and/or interval. The system may determine a baseline shift. The system may determine the first training data baseline and the second training data baseline based on the baseline shift.

At step 404, process 400 (e.g., using one or more components described above) determines an initiation class for the time series profile. For example, the system may determine a first initiation class for the first time series profile based on whether the first time point occurred during a first training period or a second training period, wherein the first training period corresponds to a first training data baseline, and wherein the second training period corresponds to a second training data baseline. For example, in order to account for the baseline shift, the system may determine what time period (or class corresponding to a time period) in which the first time series profile was initiated. By doing so, the system may account for group or global state characteristics that led to the formation of the first time series profile. For example, the system may determine that training data corresponds to different baselines or baseline states. The baseline may provide a measuring point in time that may be used as a starting point for comparison. For example, in order to determine a change in the state, the system may determine a current resting state of the system.

At step 406, process 400 (e.g., using one or more components described above) determines a first class overlap for the time series profile. For example, the system may determine a first class overlap for the first time series profile based on a first length of time that the first time period overlaps with the first training period and a uniform feature input based on the first time series profile. For example, in order to account for the baseline shift, the system may determine what time period (or class corresponding to a time period) the first time series profile overlapped with. By doing so, the system may account for group or global state characteristics that were in effect during the first time series profile.

At step 408, process 400 (e.g., using one or more components described above) determines a processing characteristic for the time series profile. For example, the system may determine a processing characteristic based on a class timeline based on the first initiation class and any class overlap. For example, the system may determine a processing characteristic based on the first initiation class and the first class overlap. For example, the system may determine a processing characteristic based on the time period (or class corresponding to a time period) during which the first time series profile was initiated and/or the time period (or class corresponding to a time period) with which first time series profile overlapped with. The processing characteristic may determine how the first times series profile is processed through models that were trained on training data corresponding to different baseline states.

In some embodiments, the system may need to reformat and/or apply one or more layers of preprocessing of the first time series profile in order to ensure that data in the first time series profile is compatible (e.g., may be processed by) the one or more models. As such, the system may generate a feature input based on the first time series profile and input the uniform feature input into the first artificial intelligence model or the second artificial intelligence model. For example, a feature input may comprise data processed through a feature input layer. The feature input layer may input feature data to a network and apply data normalization. For example, the system may apply this layer when a dataset of numeric scalars representing features requires normalization. For example, a feature may be any attribute associated with an input or sample. For example, a feature of an image could be a pixel. The feature of a state could be the Euclidean distance to the goal state. The feature of an auto loan may comprise a value of a loan term. The system may generate an input composed of multiple features and/or each of these may be specialized based on a baseline state.

The system may select one or more processing characteristics based on an initiation class and a class overlap. As described herein, the processing characteristic may comprise any characteristic and/or parameter that affect how data is processed by one or more of the models. For example, the system may determine a processing characteristic that describes how to select the data, how to select and train the models, how the models make decisions, how the models are deployed, and/or how the predictions are presented. This characteristic may be based on baseline states.

For example, each model may work differently, be keyed to different baselines, and/or have different data requirements. For example, some models may need numeric features to be normalized, and some do not. Additionally, or alternatively, when processing certain types of content (e.g., text) some models may require that the content be split into words, phrases, and/or in specific languages, including both human language and computer language. Based on the processing characteristic, the system may automatically prepare data for each different timelines, recognize and prepare text, and/or follow other data preprocessing steps. For example, the system may determine a model order for processing the first time series profile through the one or more models. However, the model architecture can remain similar and the need for re-instantiating the second model will be avoided. The system may format a uniform feature input for the first time series profile based on the model order.

In some embodiments, the system may select one or more processing characteristics based on the first initiation class and the first class overlap that correspond to one or more feature engineering requirements. For example, feature engineering is the process of altering the data to help models work more efficiently and/or process data of a particular type. For example, some feature engineering requirements may be based on baseline states (or characteristics thereof), domain knowledge of the data, business rules, and/or computing resource limitations. For example, the system may determine a feature engineering requirement for processing the first time series profile through the one or more models. The system may format a uniform feature input for the first time series profile based on the feature engineering requirement.

In some embodiments, the system may select one or more processing characteristics based on the first initiation class and the first class overlap that correspond to one or more algorithm requirements. For example, every baseline or dataset (or components within a dataset) may contain unique information that reflects the individual events and characteristics of a business (e.g., an auto loan, credit history, network activity, etc.). Due to the variety of situations and conditions, one algorithm may not successfully solve every possible business problem or dataset. Because of this, the system (or individual models) may access a diverse repository of algorithms to test against data, in order to generate the best prediction. The system may use the algorithm requirement to automatically select algorithms that are suited to the data, some are not suited to the data size, and/or efficiently process the data. For example, the system may determine an algorithm requirement for processing data from two different timelines without the changing the model design the one or more models. The system may select an algorithm for the first artificial intelligence model or the second artificial intelligence model based on the algorithm requirement.

In some embodiments, the system may select one or more processing characteristics based on the first initiation class and the first class overlap that correspond to one or more hyperparameter tuning requirements. For example, the system may use tuning which is usually a trial-and-error process by which the system changes some hyperparameters (e.g., the number of trees in a tree-based algorithm or the value of alpha in a linear algorithm), run the algorithm on the data again, then compare its performance on your validation set in order to determine which set of hyperparameters results in the most accurate model. While the models may in some embodiments have a default set of hyperparameters, different algorithms, baselines, models, and/or datasets may correspond to different hyperparameters. For example, regularized regression models may have coefficients penalties, decision trees may have a set number of branches, and neural networks may have a set number of layers. When building models (e.g., specific to a given baseline), the system may choose the default configuration of these hyperparameters after running the model on one or more datasets. For example, while default hyperparameters for each algorithm provide a starting point for analysis and will generally result in a well-performing model, it may not have the optimal configurations for your particular dataset and business problem. In order to find the best hyperparameters for the data, the system may need to tune them. For example, the system can determine a uniform hyperparameter tuning requirement for the entire timeline without the need to build multiple artificial intelligence models. The system therefore can skip tuning the first artificial intelligence model and a second artificial intelligence model based on the hyperparameter tuning requirement.

In some embodiments, the system may use the processing characteristic to determine a starting point for the generation of a prediction. For example, the system may choose a model order based on what initiation class or baseline corresponds to the time series profile. For example, the system may determine a model order for processing the first time series profile through the one or more models. The system may format a uniform feature input for the first time series profile based on the model order. Re-instantiation of separate models can be avoided this way.

At step 410, process 400 (e.g., using one or more components described above) processes the time series profile through one or more models. For example, the system may process the uniform feature input and the processing characteristic through one or more models, wherein the one or more models comprise of model or models are trained on training data for the first training period and the second training period. In some embodiments, the system may process the first time series profile through a first artificial intelligence model and a second artificial intelligence model based on the processing characteristic, wherein the first artificial intelligence model comprises a first model trained on a first training dataset, wherein the first training dataset comprises first set of training data that corresponds to the first training period, wherein the second artificial intelligence model comprises a second model trained on a second training dataset, wherein the second training dataset comprises second set of training data that corresponds to the second training period. For example, the system may independently train models based on training data corresponding to different baseline states. By doing so, the system may generate models that provide accurate predictions during time periods corresponding to those baseline states.

At step 412, process 400 (e.g., using one or more components described above) receives an output from the one or more models. For example, the system may receive a first aggregated output from the one or more models. The system may determine that a time series profile corresponds to a time period that comprises more than one baseline state. As such, the system may generate an aggregated output that determines how outputs from the one or more models are aggregated.

In some embodiments, the system may use ensemble modeling. Ensemble modeling is a process where multiple diverse models are created to predict an outcome, either by using many different modeling algorithms or using different training data sets. The ensemble model then aggregates the prediction of each base model and results in once final prediction for the unseen data. In particular, the aggregated output may comprise bagging, stacking, and/or boosting outputs. Bagging involves fitting many decision trees on different samples of the same dataset and averaging the predictions. Stacking involves fitting many different model types on the same data and using another model to learn how to best combine the predictions. Boosting involves adding ensemble members sequentially that correct the predictions made by prior models and outputs a weighted average of the predictions. For example, the system may determine an aggregation characteristic. The system may receive a first output from the first artificial intelligence model. The system may receive a second output from the second artificial intelligence model. The system may generate a modified first output based on the aggregation characteristic. The system may generate the first aggregated output based on the modified first output and the second output.

In some embodiments, the system may determine one or more weights that may be applied to outputs from one or more models. In some embodiments, the weights may be determined based on a length of time at which a time series profile corresponds to one or more training periods. For example, the system may receive a first output from the first artificial intelligence model. The system may receive a second output from the second artificial intelligence model. The system may determine a first weight based on the first class overlap. The system may determine a second weight based on a second class overlap. The system may generate the first aggregated output based on applying the first weight to the first output and the second weight to the second output.

In some embodiments, the weights may be based on whether the initiation class for a time series profile corresponds to a given training period. For example, the system may receive a first output from the first artificial intelligence model. The system may receive a second output from the second artificial intelligence model. The system may determine a first weight based on the first initiation class corresponding to the first training period. The system may determine a second weight based on the first initiation class not corresponding to the second training period. The system may generate the first aggregated output based on applying the first weight to the first output and the second weight to the second output.

In some embodiments, the system may determine one or more post-processing characteristics based on whether an initiation class corresponds to a training period and/or baseline. For example, the system may implement one or more post-processing procedures (e.g., pruning routines, rule filtering, and/or knowledge integration). For example, a post-processing characteristic may provide a filter for noisy and/or imprecise data outputted from a model. For example, the system may determine to treat an output from one model differently because that model was trained on data corresponding to a baseline during which the time series profile was originated. For example, the system may receive a first output from the first artificial intelligence model. The system may receive a second output from the second artificial intelligence model. The system may determine a first post-processing characteristic based on the first initiation class corresponding to the first training period. The system may determine a second first post-processing characteristic based on the first initiation class not corresponding to the second training period. The system may generate the first aggregated output based on applying the first weight to the first output and the second weight to the second output.

In some embodiments, the system may determine one or more post-processing characteristics based on how much of an overlap corresponds to a training period and/or baseline. For example, the system may determine to treat an output from one model differently because that model was trained on data corresponding to a baseline for which a majority of the time series profile corresponds. For example, the system may receive a first output from the first artificial intelligence model. The system may receive a second output from the second artificial intelligence model. The system may determine a first post-processing characteristic based on the first initiation class corresponding to the first training period. The system may determine a second post-processing characteristic based on the first initiation class not corresponding to the second training period. The system may generate the first aggregated output based on applying the first weight to the first output and the second weight to the second output.

In some embodiments, the system may determine a class overlap for each baseline shift and/or training period for a plurality of models. For example, in order to account for the baseline shift, the system may determine what time period (or class corresponding to a time period) the first time series profile overlapped with. In some embodiments, this may include a plurality of different classes. For example, the system may determine a second class overlap for the first time series profile based on a second length of time that the first time period overlaps with the second training period. The system may modify the processing characteristic based on the second class overlap.

At step 414, process 400 (e.g., using one or more components described above) generates a time series prediction based on the output. For example, the system may generate for display, at a user interface, a first time series prediction based on the first aggregated output. For example, in response to a request to generate a prediction, such as the likelihood that an auto loan may be charged off, the system may generate a qualitative and/or quantitative description of the likelihood.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for mitigating training data baseline shifts in artificial intelligence models comprising moving classifications.

2. The method of any one of the preceding embodiments, the method comprising: receiving a first request for a first time series prediction based on a first time series profile, wherein the first time series profile comprises time series profile data during a first time period, and wherein the first time period begins at a first time point; determining a first initiation class for the first time series profile based on whether the first time point occurred during a first training period or a second training period, wherein the first training period corresponds to a first training data baseline, and wherein the second training period corresponds to a second training data baseline; determining a first class overlap for the first time series profile based on a first length of time that the first time period overlaps with the first training period; determining a processing characteristic based on a class timeline based on the first initiation class and any class overlap; processing the uniform feature input and the processing characteristic through one or more models, wherein the one or more models comprise of model or models are trained on training data for the first training period and the second training period; receiving a first aggregated output from the one or more models; and generating for display, at a user interface, a first time series prediction based on the first aggregated output.

3. The method of any one of the preceding embodiments, wherein processing the first time series profile through the one or more models further comprises: generating a uniform feature input based on the first time series profile; and inputting the uniform feature input into the one or more models.

4. The method of any one of the preceding embodiments, wherein determining the processing characteristic based on the first initiation class and the first class overlap further comprises: determining a model order for processing the first time series profile through the one or more models; and formatting a uniform feature input for the first time series profile based on the model order.

5. The method of any one of the preceding embodiments, wherein determining the processing characteristic based on the first initiation class and the first class overlap further comprises: determining a feature engineering requirement for processing the first time series profile through the one or more models; and formatting a uniform feature input for the first time series profile based on uniform feature engineering requirement to the first model.

6. The method of any one of the preceding embodiments, wherein determining the processing characteristic based on the first initiation class and the first class overlap further comprises: determining an algorithm requirement for processing the first time series profile through the one or more models; and selecting an algorithm for the first artificial intelligence model or the second artificial intelligence model based on a uniform algorithm requirement.

7. The method of any one of the preceding embodiments, wherein determining the processing characteristic based on the first initiation class and the first class overlap further comprises: determining a hyperparameter tuning requirement for the one or more models; and tuning the first artificial intelligence model or the second artificial intelligence model based on the hyperparameter tuning requirement.

8. The method of any one of the preceding embodiments, wherein determining the processing characteristic based on the first initiation class and the first class overlap further comprises: determining a model order for processing the first time series profile through the one or more models; and formatting a uniform feature input for the first time series profile based on the model order.

9. The method of any one of the preceding embodiments, wherein receiving the first aggregated output from the one or more models further comprises: determining an aggregation characteristic; receiving a first output from the first artificial intelligence model; receiving a second output from the second artificial intelligence model; generating a modified first output based on the aggregation characteristic; and generating the first aggregated output based on the modified first output and the second output.

10. The method of any one of the preceding embodiments, wherein receiving the first aggregated output from the one or more models further comprises: receiving a first output from the first artificial intelligence model; receiving a second output from the second artificial intelligence model; determining a first weight based on the first class overlap; determining a second weight based on a second class overlap; and generating the first aggregated output based on applying the first weight to the first output and the second weight to the second output.

11. The method of any one of the preceding embodiments, wherein receiving the first aggregated output from the one or more models further comprises: receiving a first output from the first artificial intelligence model; receiving a second output from the second artificial intelligence model; determining a first weight based on the first initiation class corresponding to the first training period; determining a second weight based on the first initiation class not corresponding to the second training period; and generating the first aggregated output based on applying the first weight to the first output and the second weight to the second output.

12. The method of any one of the preceding embodiments, wherein receiving the first aggregated output from the one or more models further comprises: receiving a first output from the first artificial intelligence model; receiving a second output from the second artificial intelligence model; determining a first post-processing characteristic based on the first initiation class corresponding to the first training period; determining a second post-processing characteristic based on the first initiation class not corresponding to the second training period; and generating the first aggregated output based on applying the first post-processing characteristic to the first output and the second post-processing characteristic to the second output.

13. The method of any one of the preceding embodiments, wherein receiving the first aggregated output from the one or more models further comprises: receiving a first output from the first artificial intelligence model; receiving a second output from the second artificial intelligence model; determining a first post-processing characteristic based on the first initiation class corresponding to the first training period; determining a second post-processing characteristic based on the first initiation class not corresponding to the second training period; and generating the first aggregated output based on applying the first post-processing characteristic to the first output and the second post-processing characteristic to the second output.

14. The method of any one of the preceding embodiments, further comprising: determining a second class overlap for the first time series profile based on a second length of time that the first time period overlaps with the second training period; and modifying the processing characteristic based on the second class overlap.

15. The method of any one of the preceding embodiments, further comprising: determining a baseline shift; and determining the first training data baseline and the second training data baseline based on the baseline shift.

16. A tangible, non-transitory, machine-readable medium storing instructions that, when executed by a data processing apparatus, cause the data processing apparatus to perform operations comprising those of any of embodiments 1-15.

17. A system comprising one or more processors and memory storing instructions that, when executed by the processors, cause the processors to effectuate operations comprising those of any of embodiments 1-15.

18. A system comprising means for performing any of embodiments 1-15.

What is claimed is:

1. A system for mitigating training data baseline shifts in artificial intelligence models comprising moving classifications in network activity across computer systems, the system comprising:

one or more processors; and a non-transitory, computer readable medium comprising instructions recorded thereon that, when executed by the one or more processors, cause operations comprising:

receiving a first request for a first time series prediction based on a first time series profile, wherein the first time series profile comprises time series profile data during a first time period, wherein the first time period begins at a first time point, and wherein the time series profile data comprises user networking activity data;

determining a first initiation class for the first time series profile based on whether the first time point occurred during a first training period or a second training period, wherein the first training period corresponds to a first training data baseline, and wherein the second training period corresponds to a second training data baseline;

determining a first class overlap for the first time series profile based on a first length of time that the first time period overlaps with the first training period;

generating a uniform feature input based on the first time series profile;

determining a processing characteristic based on a class timeline based on the first initiation class and any class overlap by:

determining a model order for processing the first time series profile through one or more models; and formatting the uniform feature input for the first time series profile based on the model order;

processing the uniform feature input and the processing characteristic through the one or more models, wherein the one or more models comprise of model or models are trained on training data for the first training period and the second training period;

receiving a first aggregated output from the one or more models; and generating for display, at a user interface, the first time series prediction based on the first aggregated output, wherein the first time series prediction comprises predicted network use.

2. A method for mitigating training data baseline shifts in artificial intelligence models comprising moving classifications, the method comprising:

receiving a first request for a first time series prediction based on a first time series profile, wherein the first time series profile comprises time series profile data during a first time period, wherein the first time period begins at a first time point;

determining a first initiation class for the first time series profile based on whether the first time point occurred during a first training period or a second training period, wherein the first training period corresponds to a first training data baseline, and wherein the second training period corresponds to a second training data baseline;

determining a first class overlap for the first time series profile based on a first length of time that the first time period overlaps with the first training period and a uniform feature input based on the first time series profile;

determining a processing characteristic based on a class timeline based on the first initiation class and any class overlap by:

determining a model order for processing the first time series profile through one or more models; and formatting the uniform feature input for the first time series profile based on the model order;

processing the uniform feature input and the processing characteristic through the one or more models, wherein the one or more models comprise of model or models are trained on training data for the first training period and the second training period;

receiving a first aggregated output from the one or more models; and generating for display, at a user interface, the first time series prediction based on the first aggregated output.

3. The method of claim 2, wherein processing the first time series profile through the one or more models further comprises:

generating the uniform feature input based on the first time series profile; and inputting the uniform feature input into the one or more models.

4. The method of claim 2, wherein determining the processing characteristic based on the first initiation class and the first class overlap and the uniform feature input based on the first time series profile further comprises:

determining a model order for processing the first time series profile through the one or more models; and formatting the uniform feature input for the first time series profile based on the model order.

5. The method of claim 2, wherein determining the processing characteristic based on the first initiation class and the first class overlap and the uniform feature input based on the first time series profile further comprises:

determining a feature engineering requirement for processing the first time series profile through the one or more models; and formatting the uniform feature input for the first time series profile based on the feature engineering requirement.

6. The method of claim 2, wherein determining the processing characteristic based on the first initiation class and the first class overlap and the uniform feature input based on the first time series profile further comprises:

determining an algorithm requirement for processing the first time series profile through the one or more models; and selecting an algorithm for a first artificial intelligence model or a second artificial intelligence model based on the algorithm requirement.

7. The method of claim 2, wherein determining the processing characteristic based on the first initiation class and the first class overlap further and the uniform feature input based on the first time series profile comprises:

determining a hyperparameter tuning requirement for the one or more models; and tuning a first artificial intelligence model or a second artificial intelligence model based on the hyperparameter tuning requirement.

8. The method of claim 2, receiving the first aggregated output from the one or more models further comprises:

determining an aggregation characteristic;

receiving a first output from a first artificial intelligence model;

receiving a second output from a second artificial intelligence model;

generating a modified first output based on the aggregation characteristic; and generating the first aggregated output based on the modified first output and the second output.

9. The method of claim 2, receiving the first aggregated output from the one or more models further comprises:

receiving a first output from a first artificial intelligence model;

receiving a second output from a second artificial intelligence model;

determining a first weight based on the first class overlap;

determining a second weight based on a second class overlap; and generating the first aggregated output based on applying the first weight to the first output and the second weight to the second output.

10. The method of claim 2, receiving the first aggregated output from the one or more models further comprises:

receiving a first output from a first artificial intelligence model;

receiving a second output from a second artificial intelligence model;

determining a first weight based on the first initiation class corresponding to the first training period;

determining a second weight based on the first initiation class not corresponding to the second training period; and generating the first aggregated output based on applying the first weight to the first output and the second weight to the second output.

11. The method of claim 2, receiving the first aggregated output from the one or more models further comprises:

receiving a first output from a first artificial intelligence model;

receiving a second output from a second artificial intelligence model;

determining a first post-processing characteristic based on the first initiation class corresponding to the first training period;

determining a second post-processing characteristic based on the first initiation class not corresponding to the second training period; and generating the first aggregated output based on applying the first post-processing characteristic to the first output and the second post-processing characteristic to the second output.

12. The method of claim 2, receiving the first aggregated output from the one or more models further comprises:

receiving a first output from a first artificial intelligence model;

receiving a second output from a second artificial intelligence model;

determining a first post-processing characteristic based on the first initiation class corresponding to the first training period;

determining a second post-processing characteristic based on the first initiation class not corresponding to the second training period; and generating the first aggregated output based on applying the first post-processing characteristic to the first output and the second post-processing characteristic to the second output.

13. The method of claim 2, further comprising:

determining a second class overlap for the first time series profile based on a second length of time that the first time period overlaps with the second training period; and modifying the processing characteristic based on the second class overlap.

14. The method of claim 2, further comprising:

determining a baseline shift; and determining the first training data baseline and the second training data baseline based on the baseline shift.

15. A non-transitory, computer readable medium comprising instructions recorded thereon that, when executed by one or more processors, cause operations comprising:

receiving a first request for a first time series prediction based on a first time series profile, wherein the first time series profile comprises time series profile data during a first time period, wherein the first time period begins at a first time point;

determining a first initiation class for the first time series profile based on whether the first time point occurred during a first training period or a second training period, wherein the first training period corresponds to a first training data baseline, and wherein the second training period corresponds to a second training data baseline;

determining a first class overlap for the first time series profile based on a first length of time that the first time period overlaps with the first training period and a uniform feature input based on the first time series profile;

determining a processing characteristic based on a class timeline based on the first initiation class and any class overlap by:

determining a model order for processing the first time series profile through one or more models; and formatting the uniform feature input for the first time series profile based on the model order;

processing the uniform feature input and the processing characteristic through the one or more models trained on training data for the first training period and the second training period;

receiving a first aggregated output from the one or more models; and generating for display, at a user interface, the first time series prediction based on the first aggregated output.

16. The non-transitory, computer readable medium of claim 15, wherein processing the first time series profile through the one or more models further comprises:

generating the uniform feature input based on the first time series profile; and inputting the uniform feature input into the one or more models.

17. The non-transitory, computer readable medium of claim 15, wherein determining the processing characteristic based on the first initiation class and the first class overlap and the uniform feature input based on the first time series profile further comprises:

determining a feature engineering requirement for processing the first time series profile through the one or more models; and formatting a uniform feature input for the first time series profile based on the feature engineering requirement.

18. The non-transitory, computer readable medium of claim 15, wherein determining the processing characteristic based on the first initiation class and the first class overlap and the uniform feature input based on the first time series profile further comprises:

determining an algorithm requirement for processing the first time series profile through the one or more models; and selecting an algorithm for a first artificial intelligence model or a second artificial intelligence model based on the algorithm requirement.

19. The non-transitory, computer readable medium of claim 15, receiving the first aggregated output from the one or more models further comprises:

receiving a first output from a first artificial intelligence model;

receiving a second output from a second artificial intelligence model;

determining a first post-processing characteristic based on the first initiation class corresponding to the first training period;

determining a second post-processing characteristic based on the first initiation class not corresponding to the second training period; and generating the first aggregated output based on applying the first post-processing characteristic to the first output and the second post-processing characteristic to the second output.

20. The non-transitory, computer readable medium of claim 15, receiving the first aggregated output from the one or more models further comprises:

receiving a first output from a first artificial intelligence model;

receiving a second output from a second artificial intelligence model;

determining a first post-processing characteristic based on the first initiation class corresponding to the first training period;

determining a second post-processing characteristic based on the first initiation class not corresponding to the second training period; and generating the first aggregated output based on applying the first post-processing characteristic to the first output and the second post-processing characteristic to the second output.

* * * * *